April 19, 1955     M. T. VOIGT     2,706,545

CLUTCH

Filed Oct. 10, 1952     3 Sheets-Sheet 1

INVENTOR.
MAX T. VOIGT
BY
Mock + Blum
ATTORNEYS

April 19, 1955  M. T. VOIGT  2,706,545
CLUTCH
Filed Oct. 10, 1952  3 Sheets-Sheet 2
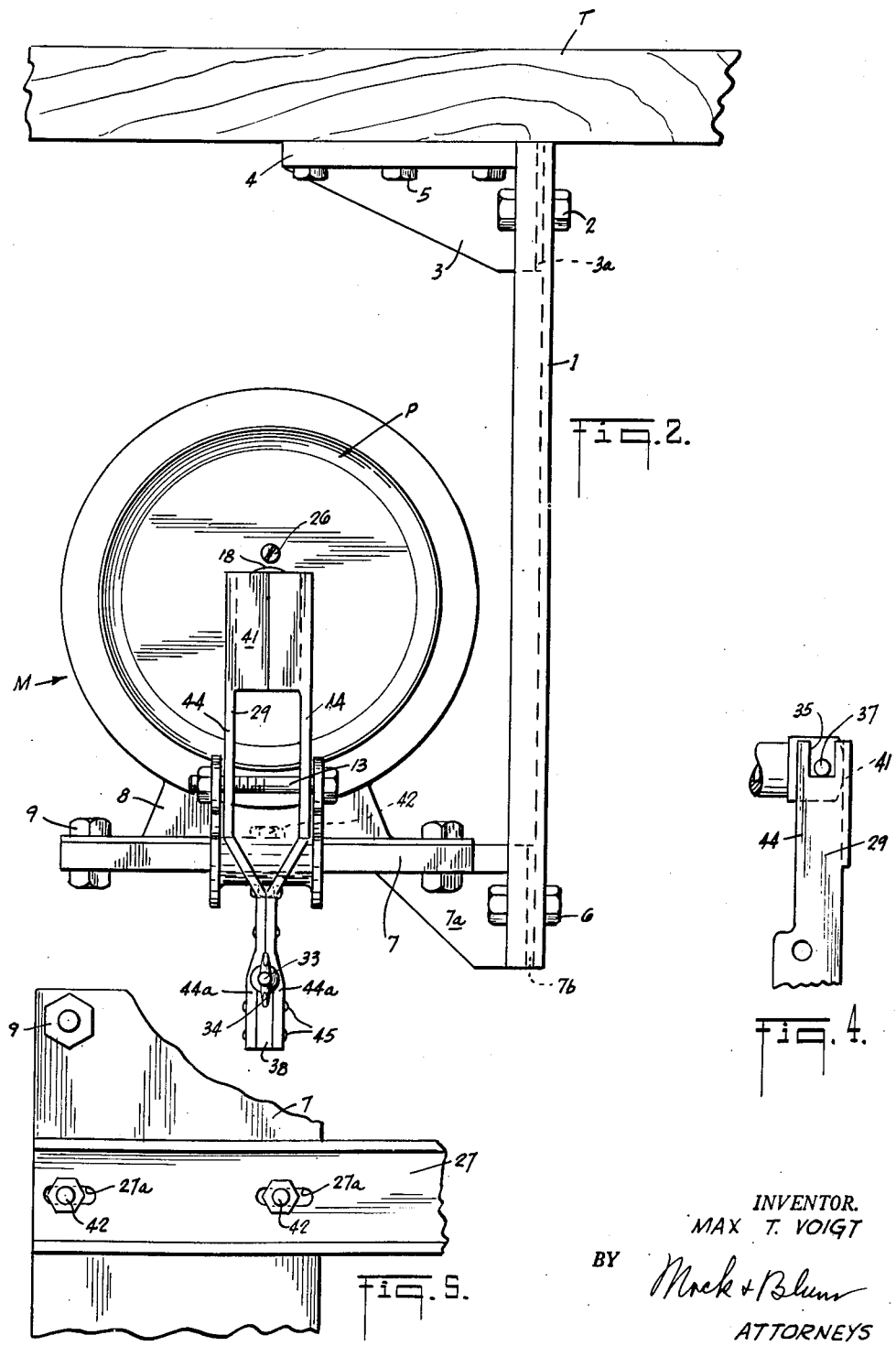
INVENTOR.
MAX T. VOIGT
BY Mock & Blum
ATTORNEYS April 19, 1955 M. T. VOIGT 2,706,545
CLUTCH
Filed Oct. 10, 1952 3 Sheets-Sheet 3
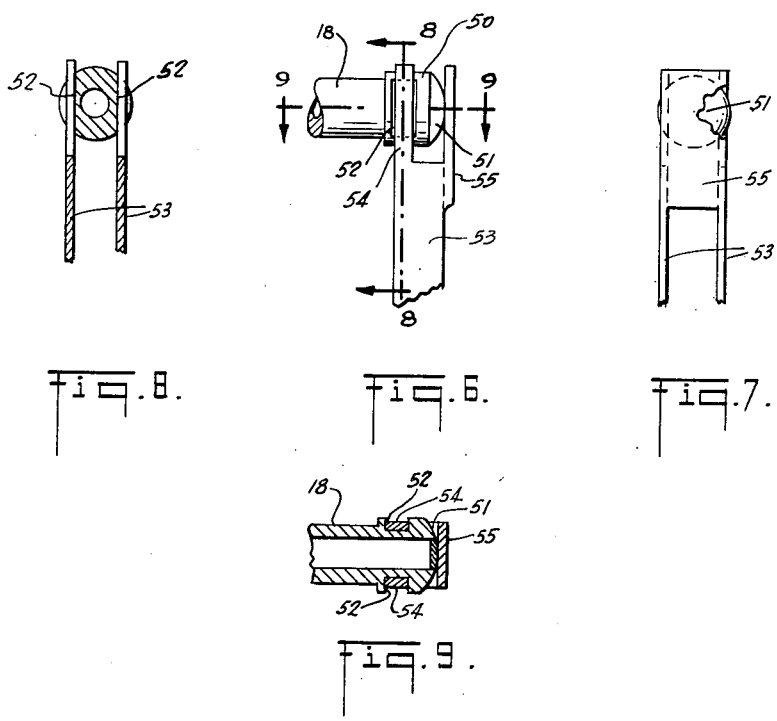
INVENTOR.
MAX T. VOIGT
BY
ATTORNEYS

United States Patent Office 2,706,545
Patented Apr. 19, 1955

2,706,545

CLUTCH

Max T. Voigt, Reading, Pa.

Application October 10, 1952, Serial No. 314,169

6 Claims. (Cl. 192—18)

This invention relates to an improved clutch which is particularly useful in the intermittent operation of a small motor, such as a one half horsepower motor, to drive a load. An important feature of this clutch is that it is designed to remain in alinement during a long period of use and requires minimum adjustment during use.

In a preferred embodiment of my invention, I provide a hollow collar which is adapted to be mounted on the driven shaft of a motor, and upon which a flywheel is mounted. This collar is integral at its front end with a further shaft. A sleeve is longitudinally slidably mounted on this further shaft. A further sleeve extends around the first sleeve and is turnably coupled thereto by bearing means. A pulley is mounted on said further sleeve at the front end thereof. The further sleeve extends intermediate its ends through an annular braking disc which is fixed in position. Said further sleeve is integral at its rear end with an annular friction disc.

Means are provided for normally maintaining the first sleeve in a forward position in which the friction disc abuts the braking disc. Additionally, manually operative means are provided for moving the first sleeve rearwardly, whereby to move the further sleeve rearwardly until the friction disc abuts the front face of the flywheel. As a result, the pulley is rotated.

Other objects and advantages of this invention will become apparent from the following description, in conjunction with the annexed drawings, in which a preferred embodiment is disclosed.

In the drawings,

Fig. 3 is a detail view in vertical action showing a collar and shaft extension thereof for mounting the clutch on a motor shaft.

Fig. 4 is a detail view of a portion of Fig. 1, showing means coupling an actuating lever to the clutch.

Fig. 5 is a bottom plan view of Fig. 1, taken on line 5—5 of said Fig. 1.

Fig. 6 is a detail view similar to Fig. 4, showing a modified structure for coupling the foot lever to the clutch sleeve.

Fig. 7 is a rear view of the modification of Fig. 6.

Fig. 8 is a section on line 8—8 of Fig. 6.

Fig. 9 is a section on line 9—9 of Fig. 6.

Figure 1:
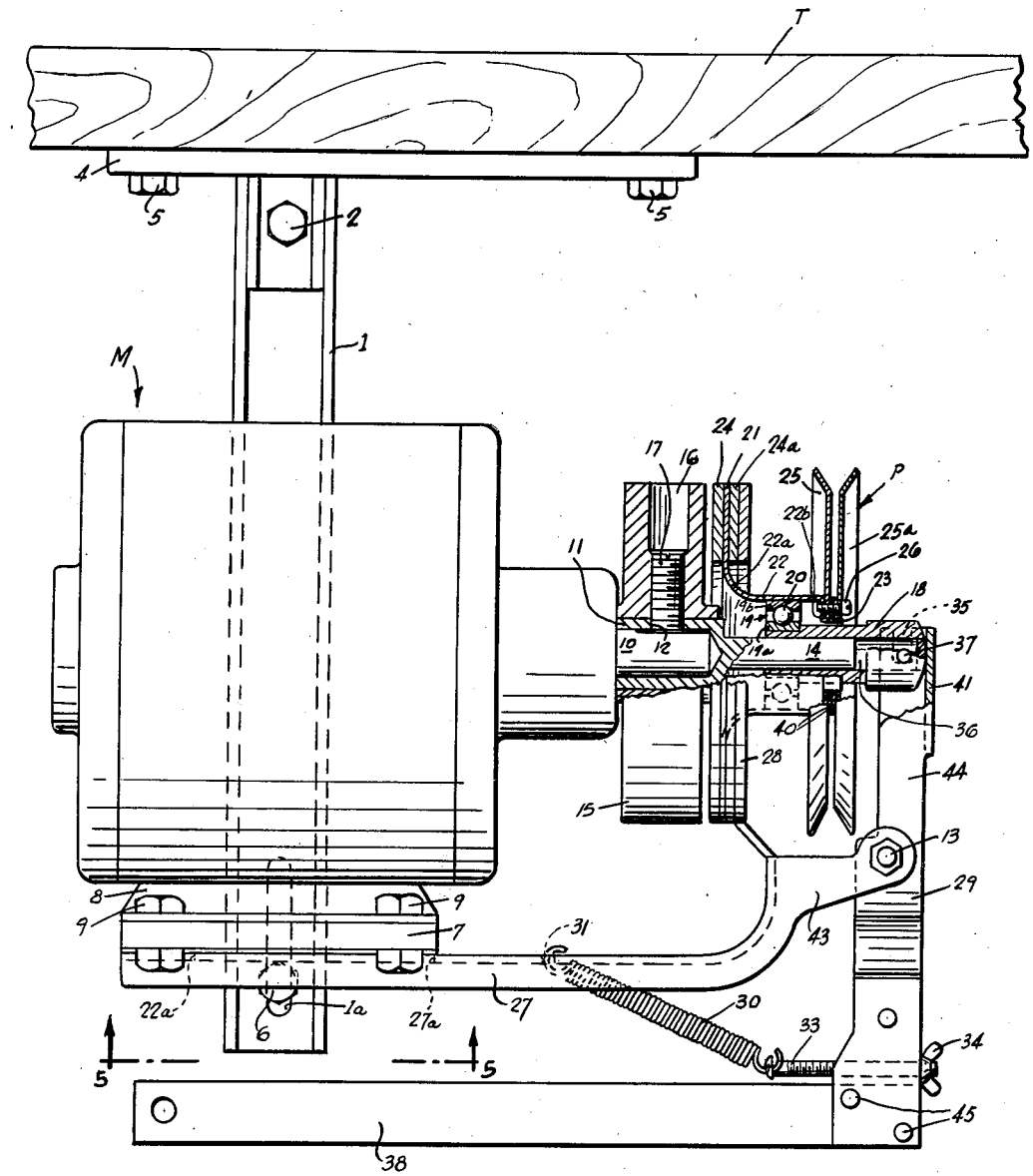
Fig. 1 is a side elevation, partly in section, of the improved clutch and also showing the motor, flywheel and drive pulley in conjunction with which the clutch is adapted to be used.

Upon reference to the drawings in detail, it will be seen that there is shown a motor M mounted below a table T. In accordance with this invention, there is provided an improved clutch for coupling the motor shaft 10 to a pulley P.

In order to support motor M, plate 4 is attached to the lower face of table T by means of bolts 5. This plate 4 has a depending lateral flange 3 which has a longitudinal extension 3a. A depending arm 1, which may be of channel iron construction, is attached to flange extension 3a by means of one or more bolts 2.

Motor support 7, which extends laterally and longitudinally, has a depending lateral flange 7a, which has a longitudinal extension 7b which is attached to arm 1 by one or more bolts 6. Bolts 6 extends through vertical slot 1a in arm 1, so that support 7 is vertically adjustable. Motor M has a base 8 which is fixed to support 7 by means of four bolts 9.

The usual motor shaft 10 extends longitudinally out of the front of motor M and is turned thereby in a conventional manner. A lining member or collar 11 has a longitudinal recess in which shaft 10 extends. Said collar 11 is integral at its front end with a shaft 14. Shaft 14 is shown as of smaller diameter than collar 11, but the invention is not limited to such relative dimensions.

A flywheel 15 is provided and has a longitudinal bore through which collar 11 extends. Collar 11 and flywheel 15 have respective through-and-through transverse bores 12 and 16 through which set screw 17 extends into abutment with shaft 10. As a result, flywheel 15 and shaft 14 turn in unison with shaft 10.

Sleeve 18 has a longitudinal bore into which shaft 14 extends turnably. Sleeve 18 is axially slidable upon shaft 14. The rear end of sleeve 18 is longitudinally spaced from collar 11 and flywheel 15. Sleeve 18 extends beyond the front end of shaft 14 and is preferably closed at its front end to provide an unfilled, closed interior space 36. This interior space 36 may be filled with packing, if desired, and with lubricating oil to reduce the friction between shaft 14 and sleeve 18. However, said interior space 36 is not packed sufficiently tightly to prevent the desired axial movement of sleeve 18 relative to shaft 14 between selected limits, as set forth below.

The inner annular race 19a of an anti-friction bearing 19 is fixed to said sleeve 18, preferably adjacent the rear end thereof. While sleeve 18 is shown in the drawings as extending frictionally into the central opening of race 19a, it will be apparent that said race 19a may be fixed to said sleeve 18 by any suitable means, so as to prevent movement of the two parts relative to each other. Said anti-friction bearing 19 has the usual outer race 19b and the usual anti-friction balls 20.

A collar 22 is fixed to outer race 19b. This collar 22 is flared outwardly at its rear end portion 22a. Said rear end portion 22a of collar 22 is integral at its rear edge with the inner edge of an annular, planar clutch plate 21. Annular friction discs 24a and 24 are respectively fixed, by any suitable means, to the respective front and rear faces of clutch plate 21. Said discs 24 and 24a are made of cork or other suitable friction material.

Collar 22 is provided at its front end with an inturned annular flange 22b which is integral with a cylindrical extension 23 which is of reduced diameter but which is spaced from sleeve 18. Said flange 22b is spaced in front of bearing 19. Pulley P is mounted on collar extension 23.

Optionally and preferably, pulley P is composed of two annular half pulley members 25 and 25a and a plurality of cylindrical washers 40 positioned between said members 25 and 25a. These members 25 and 25a, together with washers 24, are all mounted on collar extension 23 and are fixed to flange 22b by means of bolts 26 which extend through said members 25 and 25a, washers 40 and flange 22b.

Pulley P may be of any suitable conventional construction, or may be replaced by any other suitable drive member.

The drive belt which may be driven by pulley P and connected to a driven mechanism is conventional and is, therefore, not shown. The number of washers 40 may be varied, so as to adjust the width of pulley P and thereby regulate the speed ratio which is produced by the feed of the belt. In addition, pulley members 25 and 25a of various tapers and sizes may be used, so as to regulate the speed ratio of the transmission. Also, as stated above, support 7 is vertically adjustable with respect to table T, thereby providing means for adjusting the tension of the belt.

A longitudinally extending arm 27 is mounted upon the lower face of support 7 by means of a pair of screws 42 which extend through longitudinal slots 27a in said arm 27. Arm 27 is longitudinally adjustable with respect to support 7. Arm 27 is optionally of inverted channel iron shape.

At its front end, arm 27 curves upwardly and is integral with an upstanding annular disc 28 which serves as a stationary braking disc for clutch disc 21. Disc 28 is positioned in front of friction disc 24a with collar 22 extending through the central opening of said disc 28.

Disc 21 is movable between a braking position, shown in the views, in which friction disc 24a abuts braking disc 28, and an operating position in which friction disc 24 abuts flywheel 15. In order to control the movement of said disc 21, arm 27 is provided at its front end with a pair of integral forwardly extending, laterally spaced mounting arms 43. Lever 29 is pivotally mounted on said arms 43.

Said lever 29 comprises a pair of transversely extending, laterally spaced legs 44. These legs 44 are respectively located in parallel longitudinal planes and are connected at the upper portion of their forward edges by a transverse, laterally extending head 41. Legs 44 are positioned between the extension arms 43 of arm 27 and are connected to said arms 43 by a suitable lateral pivot 13 so as to be turnable about the axis thereof.

Sleeve 18 is provided adjacent its front end with a pair of alined, laterally outwardly extending pins 37. These pins 37 are respectively located within respective transverse slots 35 in said legs 44. This is clearly shown in Fig. 4. Pins 37 are transversely movable within said slots 35. In addition, said pins 37 have a diameter which is smaller than the width of slots 35, so as to permit longitudinal play of legs 44 with respect to sleeve 18. Lever head 41 is in longitudinal registration with the front end of sleeve 18.

The legs 44 converge toward each other at their respective lower ends and are provided with integral depending extensions 44a. A longitudinally extending bar 38 is secured at its lower end between these leg extensions 44a, by means of rivets 45 or the like. The rear end of bar 38 may be connected to any suitable means for depressing said rear end of bar 38, such as a foot-operated pedal (not shown).

A return spring 30, which may be a coil spring, is connected between arm 27 and lever 29. One end of spring 30 may be passed through a retaining hole 31 in arm 27. The other end of spring 30 may be connected to the head of an adjusting screw 33 which extends between leg portions 44a and protrudes in front thereof. Wing nut 34 may be screwed onto the protruding end of screw 33 to any desired position so as to adjust the tension of spring 30. Optionally, spring 30 may be supported and adjusted by any other suitable means.

In operation, the rear end of bar 38 is depressed by a strong force, against the action of spring 30. As a result, head 41 is forced rearwardly against the front face of sleeve 18, with pins 37 riding freely in slots 35. Sleeve 18 is pushed rearwardly, whereby friction disc 24 is held in abutment with the front face of flywheel 15. When shaft 10, flywheel 15 and shaft 14 turn in unison, friction disc 24 and collar 22 also turn. (Sleeve 18 cannot turn with respect to shaft 14, but bearing 19 permits collar 22 to turn with respect to sleeve 18.) As a result, pulley P is driven.

When the force upon bar 38 is released, the action of spring 30 causes head 41 to move forwardly. The rear edges of slots 35 strike pins 37 and cause sleeve 18 to move forwardly until friction disc 24a is held against braking disc 28, thereby stopping the movement of pulley P.

By adjusting the tension upon spring 30 and by adjusting the longitudinal position of arm 27 with respect to support 7, it is possible to compensate for wear in either of the friction discs 24 or 24a.

A modification in the manner of coupling the lever to the clutch is shown in Figs. 6–9. In this modification, sleeve 18 is provided with a modified front or head portion 50. Said head portion 50 is preferably of somewhat enlarged diameter compared to the remainder of sleeve 18. Said head portion 50 is closed at its front end 51. Said head portion 50 has a pair of transversely extending side grooves 52.

In this modification, the legs 44 of lever 29 are replaced by legs 53. Each said leg 53 has an upward extension bar 54 at the front portion of its upper edge, said extension bar 54 being located within a respective groove 52. Said legs 53 are connected at the upper portion of their forward edges by a transverse, laterally extending head 55 which extends above said legs 53. The upper portion of said head 55 is in longitudinal registration with sleeve end 51.

The distance between the front and rear edges of said bars 54 is less than the distance between the front and rear faces of said grooves 52. When the head 55 is moved rearwardly, it strikes sleeve end 51 and drives sleeve 18 rearwardly, with legs 54 being then spaced from the front and rear edges of the respective grooves 52. When head 55 moves forwardly, legs 54 strike the front faces of the respective grooves 52 and carry sleeve 18 forwardly.

Figure 2:
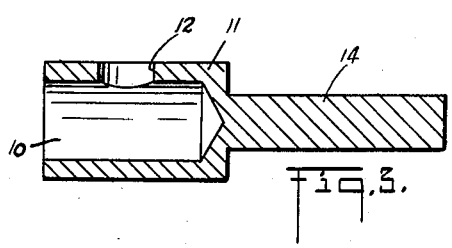
Fig. 2 is a front elevation of Fig. 1.

This construction has certain advantages over that of Figs. 1–5. In particular, pins 37 are eliminated, and sleeve head 50 may be cast in a single piece, without the necessity for expensive machine operations. Head 50 is shown as integral with sleeve 18 but may be formed separately if desired.

While I have disclosed preferred embodiments of my invention and have indicated various changes, omissions and additions which may be made therein, it will be apparent that various changes, omissions and additions may be made in the invention without departing from the scope and spirit thereof.

I claim:

1. A clutch assembly for a motor mounted on a frame and having a driven shaft which extends in a forward longitudinal direction, said assembly comprising a collar which is adapted to be fixedly mounted on said driven shaft, a flywheel fixedly mounted on said collar and having a transverse front end face, said collar extending forwardly of said driven shaft and being integral at its front end with a further forwardly extending shaft which is coaxial with said driven shaft, a first sleeve mounted on said further shaft and longitudinally slidable thereon, said first sleeve extending beyond the front end of said further shaft, an anti-friction ball bearing whose inner race is mounted on the outer peripheral wall of said first sleeve, a second sleeve whose inner peripheral wall is mounted on the outer race of said bearing, a pulley fixedly mounted on said second sleeve intermediate its ends, a transverse outwardly extending annular friction disc which is integral with said second sleeve at the rear edge thereof, an annular braking disc fixedly mounted on said frame and extending transversely and positioned between said friction disc and said pulley with said second sleeve extending turnably through the opening of said braking disc, and means coupled to said first sleeve forwardly of said driven shaft for moving said first sleeve longitudinally between a first position in which said friction disc frictionally abuts said braking disc to prevent said sleeve from turning and a second position in which said friction disc frictionally abuts said front face of said flywheel whereby said pulley is driven.

2. A clutch assembly in accordance with claim 1, in which said means for moving said first sleeve from its first position to its second position comprises a lever pivotally mounted on said frame for movement about a lateral axis, said lever having at one end thereof a laterally and transversely extending head portion, said head portion being proximate to and in longitudinal registration with the front end of said first sleeve whereby movement of the other end of said lever in a first direction causes the rear face of said head portion to strike against said front end of said first sleeve and force said first sleeve rearwardly, and in which said means for moving said first sleeve from its second position to its first position comprises a spring, one end of said spring being attached to said frame and the other end of said spring being attached to said other end of said lever, said spring tending to move said other end of said lever in a second direction which is opposite to its first direction of movement, said lever having a pair of laterally spaced, transversely and longitudinally extending arms which are connected to said head portion and which extend rearwardly thereof on opposite sides of said first sleeve, said arms respectively having transversely and longitudinally extending slots therein, said first sleeve having pins extending from the opposite sides thereof and respectively extending into respective slots, said rear ends of said slots striking said pins when said other end of said lever is moved in said second direction whereby said first sleeve is returned to its first position, the distance from the rear face of said head portion to the front edge of said slot being less than the distance from the front edge of said first sleeve to said pin.

3. A clutch assembly in accordance with claim 1, in which said means for moving said first sleeve between first position and its second position comprises a lever pivotally mounted on said frame for movement about a lateral axis, said lever having a laterally and transversely extending head portion, means loosely coupling said head portion to said first sleeve, said coupling means permitting transverse movement of said head portion relative to said first sleeve and permitting the rear face of said head portion to strike the front edge of said first sleeve and drive same rearwardly to its second position during rearward movement of said head portion, said coupling means also permitting said head portion to carry said first sleeve forwardly during forward movement of said head portion, and a spring connected between said lever and said frame and normally actuating said lever and hence said first sleeve so as to maintain said first sleeve in its first position.

4. A clutch assembly in accordance with claim 1, in which said means for moving said first sleeve from its first position to its second position comprises a lever pivotally mounted on said frame for movement about a lateral axis, said lever having at one end thereof a laterally and transversely extending head portion, said head portion being proximate to and in longitudinal registration with the front end of said first sleeve whereby movement of the other end of said lever in a first direction causes the rear face of said head portion to strike against said front end of said first sleeve and force said first sleeve rearwardly, and in which said means for moving said first sleeve from its second position to its first position comprises a spring, one end of said spring being attached to said frame and the other end of said spring being attached to said frame and the other end of said spring being attached to said other end of said lever, said spring tending to move said other end of said lever in a second direction which is opposite to its first direction of movement, said lever having at said one end thereof a pair of lateral spaced, transversely and longitudinally extending arms which are positioned rearwardly of said head portion and which are longitudinally spaced therefrom and which are positioned on opposite sides of said first sleeve, said first sleeves having respective transversely extending grooves therein in which said arms are respectively located, said arms being longitudinally and transversely movable within said grooves, the distance between the front end of said first sleeve and the rear faces of said grooves being greater than the distance between the rear face of said head portion and the rear edges of said arms, the front edges of said arms striking the front faces of said grooves when said other end of said lever is moved in said second direction whereby said first sleeve is returned to its first position.

5. A drive and braking assembly for a motor mounted on a frame and having a drive shaft which extends in a forward longitudinal direction and also having a fly wheel fixed to said shaft rearwardly of the front end thereof, said assembly comprising a sleeve turnably mounted on said shaft forwardly of said fly wheel and longitudinally slidable thereon, a second sleeve mounted on said first sleeve so as to be turnable relative thereto and so as to be axially immovable relative thereto, a transverse annular friction disc fixedly mounted on said second sleeve at the rear end thereof, a driven member fixedly mounted on said second sleeve forwardly of said friction disc, an annular braking disc fixedly mounted on said frame and extending transversely and positioned between said friction disc and said driven member with said second sleeve extending slidably and turnably through the opening of said braking disc, and means for moving said first sleeve longitudinally between a first position in which said friction disc frictionally abuts said braking disc and a second position in which said friction disc frictionally abuts the front face of said fly wheel.

6. An assembly in accordance with claim 5, in which said means for moving said first sleeve between first position and its second position comprises a lever pivotally mounted on said frame for movement about a lateral axis, said lever having a laterally and transversely extending head portion, means loosely coupling said head portion to said first sleeve, said coupling means permitting transverse movement of said head portion relative to said first sleeve and permitting the rear face of said head portion to strike the front edge of said first sleeve and drive same rearwardly to its second position during rearward movement of said head portion, said coupling means also permitting said head portion to carry said first sleeve forwardly during forward movement of said head portion, and a spring connected between said lever and said frame and normally actuating said lever and hence said first sleeve so as to maintain said first sleeve in its first position.

References Cited in the file of this patent

UNITED STATES PATENTS

| | | |
|---|---|---|
| 2,274,457 | Peets et al. | Feb. 24, 1942 |
| 2,555,189 | Fuchslocher | May 29, 1951 |
| 2,609,075 | Schulder | Sept. 2, 1952 |
| 2,611,278 | Turnbull | Sept. 23, 1952 |
| 2,632,333 | Eller | Mar. 24, 1953 |

FOREIGN PATENTS

| | | |
|---|---|---|
| 826,391 | Germany | Jan. 3, 1952 |